United States Patent [19]

Rieger

[11] Patent Number: 4,872,164
[45] Date of Patent: Oct. 3, 1989

[54] METHOD AND ARRANGEMENT FOR COMPENSATING SHIFTS IN DELAY PRODUCED BY THE DOPPLER EFFECT IN BURSTS IN A TDMA FRAME

[75] Inventor: Günther Rieger, Auenwald, Fed. Rep. of Germany

[73] Assignee: ANT Nachrichtentechnik GmbH, Backnang, Fed. Rep. of Germany

[21] Appl. No.: 238,150

[22] Filed: Aug. 30, 1988

[30] Foreign Application Priority Data

Sep. 4, 1987 [DE] Fed. Rep. of Germany ....... 3729586

[51] Int. Cl.$^4$ ............................................. H04J 3/16
[52] U.S. Cl. ............................................... 370/104.1
[58] Field of Search .................... 370/104, 95, 89, 100

[56] References Cited

U.S. PATENT DOCUMENTS

| | | | |
|---|---|---|---|
| 3,787,634 | 1/1974 | Haberle et al. | 370/104 |
| 3,906,364 | 9/1975 | Dobson | 375/8 |
| 3,995,111 | 11/1976 | Tsuji et al. | 370/104 |
| 4,001,690 | 1/1977 | Mack et al. | 370/104 |
| 4,017,684 | 4/1977 | Kurihara et al. | 370/104 |
| 4,577,316 | 3/1986 | Schiff | 370/104 |

FOREIGN PATENT DOCUMENTS 2339455 2/1975 Fed. Rep. of Germany .
2843189 4/1979 Fed. Rep. of Germany .

*Primary Examiner*—Douglas W. Olms
*Attorney, Agent, or Firm*—Spencer & Frank

[57] ABSTRACT

A method for compensating for shifts in delay caused by the Doppler effect in the bursts from ground stations when received by a transponder satellite, wherein a search is made within the bursts for agreed-upon bit patterns. Then a phase comparison is made between the system clock pulse of the satellite and the clock pulse recovered from the bursts, with the point in time of this phase comparison being derived from the finding of the bit pattern. Depending on the result of the phase comparison, the burst are now delayed to a greater or lesser extent.

13 Claims, 3 Drawing Sheets

METHOD AND ARRANGEMENT FOR COMPENSATING SHIFTS IN DELAY PRODUCED BY THE DOPPLER EFFECT IN BURSTS IN A TDMA FRAME

BACKGROUND OF THE INVENTION

The present invention relates to a method for compensating for shifts in the delay of bursts caused by the Doppler effect in at least one subscriber station during reception by a transponder, particularly a satellite, with the bursts being combined into TDMA frames, and to a circuit arrangement for this purpose.

To compensate for shifts in delay produced by the Doppler effect in bursts (data bundles) from different subscriber stations, particularly satellite ground stations, received by means of a transponder, particularly a satellite, it is known to exchange an additional reference signal, and to derive a control signal for phase and frequency regulation from the difference between the additional reference signal and a further signal. Such an arrangement is disclosed in Federal Republic of Germany No. OS 2,339,455, and corresponding U.S. Pat. No. 3,906,364. Federal Republic of Germany No. OS 2,843,189 discloses the use of a guide station to organize the TDMA traffic and to compensate for Doppler caused shifts in delay. The receiving circuits of these guide stations follow the reference bursts (frame reference bursts) transmitted by the ground stations and returned via the transponder. As soon as all reference bursts are known, the time position of the gaps in reception are adjusted and thus the Doppler effects are corrected until the received reference bursts are lined up correctly.

SUMMARY OF THE INVENTION

It is an object of the present invention to provide a method of compensating for shifts in the delay of bursts caused by the Doppler effect in at least one subscriber station during reception by a transponder, particularly a satellite, with the bursts being combined into TDMA frames, in which method the delay compensation can be effected without additional exchange of data with a subscriber station or a guide station. Moreover, it is a further object to provide an arrangement for implementing such a method.

The above object is achieved with respect to the method according to the invention by a method of compensating for shifts in the delay of bursts caused by the Doppler effect in at least one subscriber station during reception by a transponder, with the bursts for the respective stations each including a preamble portion followed by a unique bit pattern agreed upon between the subscriber stations and the transponder, and a following information portion, and with the bursts being combined into TDMA frames, wherein the method comprises the steps of:

searching the bursts of a first TDMA frame with respect to each subscriber station to locate the unique bit pattern;

upon location of a unique bit pattern in a respective burst, generating a corresponding respective control signal for a phase comparison;

utilizing the respective control signals to perform a respective phase comparison, on each respective subscriber station burst in the next frames, between a clock pulse recovered from the preamble of the burst and the system clock pulse of the transponder; and delaying the bursts of each subscriber station in the next frame by (a) a fraction of the period of the system clock pulse if the phase of the respective recovered clock pulse lags behind the system clock pulse by up to 180°, and (b) a multiple of that fraction if the phase of the respective recovered clock pulse lags behind the system clock pulse by more than 180° but less than 360°.

According to the preferred embodiment of the invention, the method further comprises the steps of: storing the phase comparison results for the bursts of each subscriber station during each frame, and utilizing the stored results as reference values for the respective phase comparisons within the next following TDMA frame.

According to the preferred features of the invention, the fraction of the period of the system clock pulse is selected to be ½ and the multiple of this fraction is selected to be 2, and after the step of delaying, the bursts are additionally delayed by ¼ of the period of the system clock pulse.

Moreover, the step of searching preferably includes: employing a respective search window to locate the unique bit pattern of each respective burst, with the beginning of each window being determined by the arrival of the earliest burst information from each subscriber station and with the length of the window being selected to be sufficiently large that one unique bit pattern can be detected for the respective subscriber station; and, reducing the search window to the length of the unique bit pattern plus a tolerance range for the following bursts of each subscriber station.

The method according to the invention has the particular advantage that compensation for shifts in the delay of the bursts caused by the Doppler effect can be effected on-board, i.e. in the transponder (satellite), without coupling back to a ground station. Synchronism between the system clock pulse of the satellite and the clock pulse derived from the bursts is realized without back-checking the TDMA signal in a ground station. This considerably simplifies the exchange of data between the satellite and the ground stations. After an identification word agreed upon between the satellite and the ground station(s) has been found, it is merely necessary to make one follow-up regulation per frame on-board the transponder or satellite. By storing previously determined results, these results can be utilized again during subsequent regulating cycles, which considerably simplifies processing. The method according to the invention is particularly suitable for data traffic in an Inmarsat network which is provided for the purpose of establishing two-way connections between on-shore radio stations and ships or oil raising platforms, respectively.

The above object is generally achieved with respect to the invention by an apparatus for use in a transponder for compensating for shifts in the delay of bursts caused by the Doppler effect in at least one subscriber station during reception by the transponder, and wherein the bursts for the respective stations are combined into TDMA frames with each burst including a preamble portion followed by a unique bit pattern agreed upon between the subscriber station and the transponder, and a following information portion, which apparatus comprises:

a first circuit means, disposed at the input of the apparatus, for serially receiving the respective bursts of a frame and for establishing a fixed phase relationship between the respective burst information and a clock pulse recovered from the respective burst preamble;

a first linkage logic means for providing an output signal in dependence on the appearance of a generated control signal for a phase comparison and the system clock pulse of the transponder;

a second circuit means for performing a phase comparison between the output signal from the first linkage logic means and the recovered clock pulse;

a first memory means for storing the phase comparison results of all subscriber stations produced by the second circuit means during a frame;

a third circuit means, connected to the output of the first circuit means and responsive to the respective the recovered block pulse and the respective phase comparison result stored in the first memory means, for selectively delaying the respective bursts of a frame by a fraction of the period of the system clock pulse, or by a multiple of the fraction;

a fourth circuit means for receiving the delayed bursts from the third circuit means and for establishing a fixed phase relationship between the system clock pulse and the delayed bursts; and a fifth circuit means, connected to the output of the fourth circuit means, for searching the bursts for each subscriber station for the unique bit pattern and for generating the control signal for a phase comparison for the first logic linkage means upon location of the respective the bit pattern.

One embodiment of the invention will now be described in greater detail with reference to the drawing figures.

DETAILED DESCRIPTION OF THE PREFERRED EMBODIMENT

Figure 1:
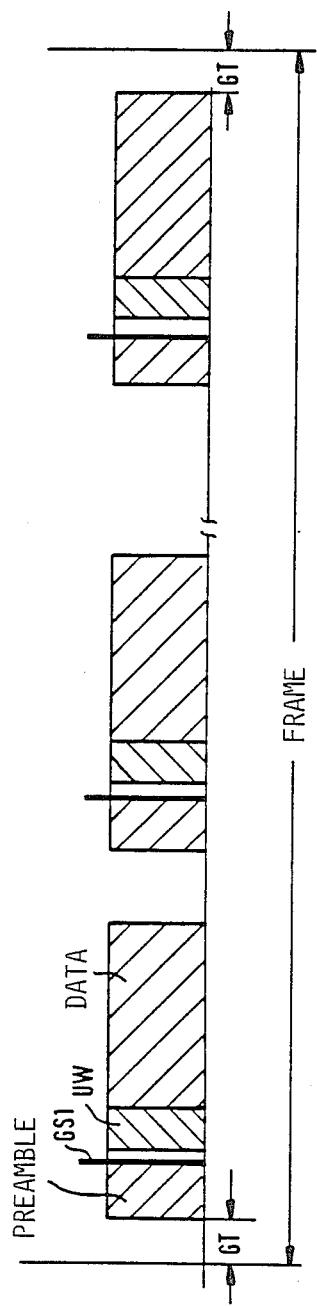
FIG. 1 shows the frame structure of a TDMA transmission.

As shown in FIG. 1, a safety period (guard time) GT is provided at the beginning of each TDMA frame. Each data bursts is composed of a preamble, a control word UW (unique word) and a data portion, with the data portion including instruction data or communications data. The preamble is composed of information to recover the clock pulse, and the control word UW is a bit pattern composed, for example, of 16 bits, and is known to the ground stations as well as to the transponder or satellite. On the basis of this bit pattern of the control word, a control signal can be generated for phase comparison as will be described in greater detail below. Although only three bursts are illustrated for the TDMA frame in FIG. 1, it is to be understood that, for example, the bursts of 25 ground stations are accommodated in a TDMA frame, with each one of these 25 ground stations having 28 associated bursts for different broadcasting areas.

In the circuit for implementing the method according to the invention, the received data bursts, which have been demodulated in a known manner, are fed to a D-flip-flop FF1 at the input. A clock pulse CLR, which has been recovered from the preamble of the data bursts in a known manner, is utilized to clock flip-flop FF1. For the recovery of clock pulse CLR from the preamble of the bursts of the received TDMA frame, customary arrangements can be employed, for example, a phase control loop. Flip-flop FF1 establishes a fixed phase relationship between the respective burst information and the recovered clock pulse CLR. The output Q of flip-flop FF1 is connected with an exclusive-OR gate EXOR2. A second D-flip-flop FF2, to whose input is fed the recovered clock pulse CLR, serves to perform a phase comparison between the system clock pulse CLB of the satellite and the recovered clock pulse CLR. This flip-flop FF2 is not clocked directly by the system clock pulse CLB but by way of a linkage logic, i.e., OR gate OR1, which receives the system clock pulse CLB at one input and a control signal GS1 at its other input. This control signal GS1 is processed in a special generating stage separately for the bursts of each ground station as will be described in greater detail below.

The result of the phase comparison for the burst of each ground station in flip-flop FF2 is stored separately per frame in a memory RAM1 since the bursts of each ground station have of course a different delay relative to the satellite. The stored phase comparison results for each ground station are available as reference values for the phase comparison during the next TDMA frame. As shown, the read-write control of memory RAM1 is also effected by the generated control signal GS1. A logic antivalence or exclusive —OR linkage circuit EXOR1 links the recovered clock pulse CLR with the result of each phase comparison output of memory RAM1. If output Q of flip-flop FF1 displays a logic 0, the recovered clock pulse CLR is forwarded without change via the gate EXOR1 to the clock pulse input of a further D-flip-flop FF3. If output Q of the second flip-flop FF2 shows a logic 1, the recovered clock pulse CLR is inverted by the gate EXOR1 and forwarded to the clock pulse input of this flip-flop FF3. Since flip-flop FF3 receives the output signal of exclusive-OR gate EXOR2 as the input signal, this means a delay of the bursts from each ground station in the next TDMA frame by a fraction, and in particular, one-half of the period of the system clock pulse CLB if the phase comparison indicates that the recovered clock pulse CLR is delayed relative to the system clock pulse CLB by up to 180°. If the recovered clock pulse CLR is delayed by more than 180° but less than 360°, the recovered clock pulse CLR is delayed by a multiple of the previous fraction, and in particular, by twice the clock pulse period, i.e. by a full system clock pulse period.

The output of flip-flop FF3 is connected with a delay circuit composed of a resistor R and a capacitor C of such dimensions that the output signal of flip-flop FF3 is again delayed by one-quarter of the system clock pulse period. This delay is introduced for the purpose of reliably synchronizing the bursts, which are synchronized with the system clock pulse CLB by means of a D-flip-flop FF4, i.e., to be able to evaluate the bursts always approximately in the middle of a clock pulse period, even if the fluctuations in the clock pulse at the output of linkage circuit EXOR1 are small. A Schmitt trigger circuit SM serves to make the edges of the input signals of flip-flop FF4 steeper and thus to also increase the synchronization reliability. Due to the above measures, the output signals of flip-flop FF4, i.e. the burst data, always have a fixed phase relationship to the system clock pulse CLB of the satellite and can be further processed for the most varied purposes.

The then following part of the circuit serves to generate the control signal GS1 for a phase comparison. Since the data bursts for each ground station arrive with different time delays, the same conditions must be created for all phase comparisons. For this purpose, the control word UW for the respective bursts of the first frame is examined for a bit pattern and once this bit pattern is found, a respective control signal for a phase comparison of the bursts with the next-following frames is generated.

In order to locate the bit pattern of the control word UW, which has a width, for example, of 16 bits, the output signal of flip-flop FF4 is initially subjected to a series/parallel conversion by means of a series/parallel converter SP1. The parallel outputs of the bursts are fed to a comparison stage EXOR3 which is formed of respective exclusive —OR circuits, which, in the illustrated embodiment, has a width of 16 bits, and which compares each output bit with a threshold value. The composition of the 16 threshold values, i.e. their sequence within comparison stage EXOR3, corresponds to the bit pattern known to the ground station and to the satellite. By way of an address controlled multiplexer MUX 16:1, the output signals of comparison stage EXOR3 are fed serially via an OR gate OR2 to an enable input EnP of a counter Z1. This counter Z1 counts the number of coincidences in the output bits of comparison stage EXOR3. For real time processing, clock pulse CLK of counter Z1 is 17 times higher than the system clock pulse CLB.

In order to suppress a sequence of signals in the data portion of the bursts which sequence may accidentally coincide with the agreed-upon bit pattern, counter Z1 is controlled, via its enable input EnT, by a time window signal Wdw, i.e., the counter Z1 is enabled for counting only within this time window. Since this time window Wdw must run along with the various burst delays, it is separately generated like the respective phase comparison control signals GS1 for the bursts of each ground station. Two errors are allowed in bit pattern recognition; i.e., the output of counter Z1 already carries a logic 1 if 14 of 16 bits coincide. In that case, counter Z1 is stopped by way of its output signal, OR gate OR2 and its enable input EnP. Counter Z1 is reset when the 17th clock pulse CLK arrives. In the illustrated embodiment, time window Wdw is normally preset to a width of 18 bits, i.e., two bits greater than the pattern to be recognized so that regulation of the bursts by ±1 clock pulse step is possible. Only if a bit pattern can no longer be found within time window Wdw, is the width of the window enlarged until a bit pattern can again be found.

Figure 2:
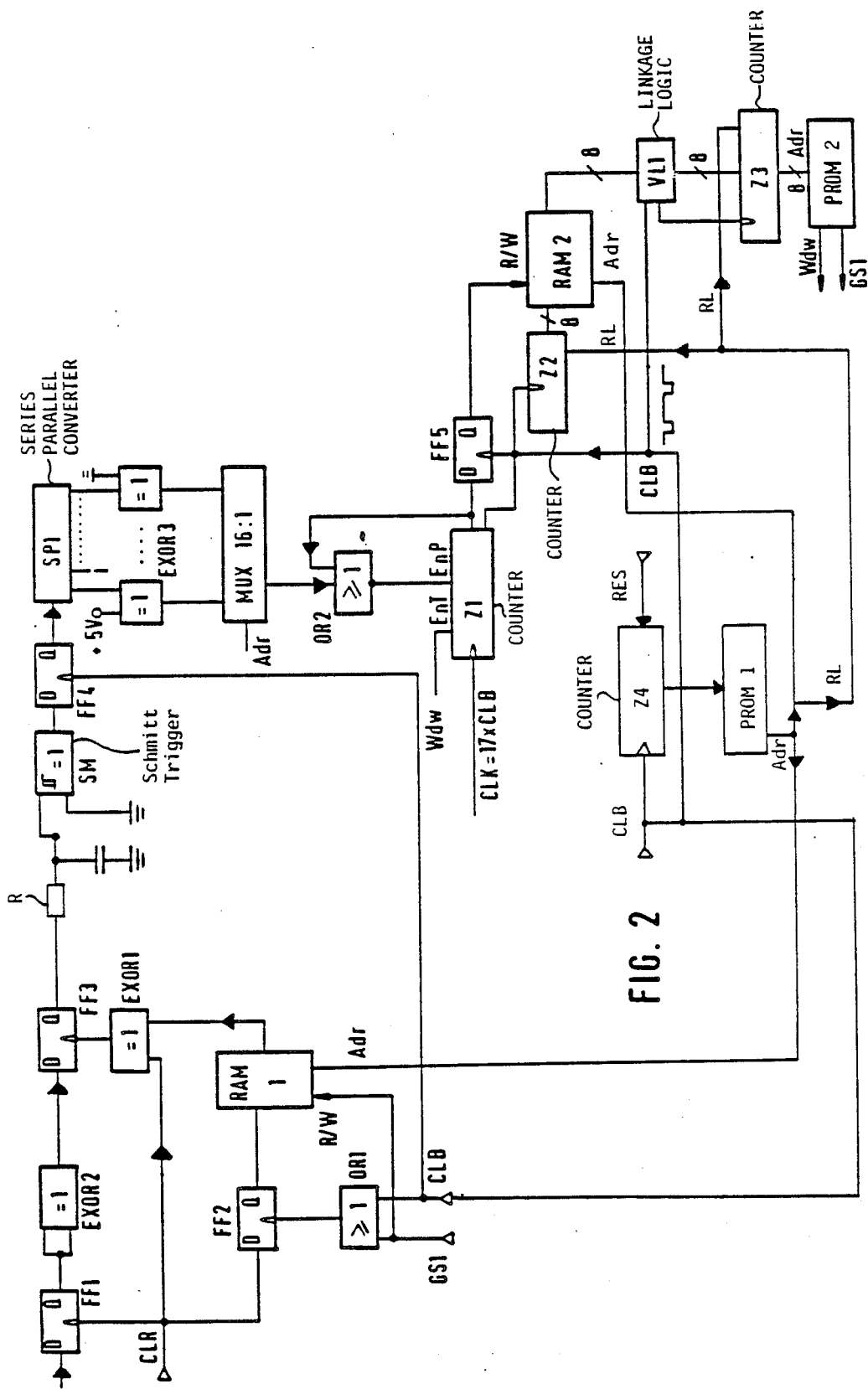
FIG. 2 is a block circuit diagram of an arrangement for implementing the method according to the invention.

The output signal of counter Z1 is transferred to the input of a further D-flip-flop FF5 which serves to provide read-write control of a further memory RAM2. A further counter Z2 counts the system clock pulses CLB. This counter Z2 is reset by a reset pulse RL at a fixed point in time. This reset pulse RL is again derived from the system clock pulse CLB. FIG. 2 also shows how the reset pulse RL is derived. The system clock pulses CLB are fed to counter Z4. The reset pulses RES for this counter Z4 are transmitted from the ground stations in such a way that the reset pulses RES have a fixed relationship to the frame shown in FIG. 1. The rest pulses RES can, e.g. be transmitted at the beginning of each frame. The output of counter Z4 is fed to address inputs of PROM1, which generates various control signals, such as the reset pulse RL, and the addresses of memories RAM1 and RAM2. So reset pulse RL is generated at the beginning of the guard time of each frame.

The output of counter Z2 is connected with the data input of the memory RAM2. As soon as a bit pattern is detected by the counter Z1, the momentary count of counter Z2 is transferred in parallel to memory RAM2, since flip-flop FF5 then switches to write control. Thus, all momentary phase positions of the bursts of the 25 different ground stations are stored in memory RAM2. Counter Z2 is started at the earliest possible point in time. If a bit pattern is not detected by counter Z1, time window Wdw is broadened until a bit pattern is found again. This broadening of the window is effected by a linkage logic VL1 at the output of memory RAM2 which controls the transfer of the memory results of memory RAM2 in parallel into a counter Z3, and blocks the clock pulse CLB fed to the count input of counter Z3 until a bit pattern has been found. Counter Z3 is a backward counter which receives the memory contents of memory RAM2 as its starting value for counting. Counter Z3 is reset at the same fixed point in time as counter Z2, i.e., via the reset pulse RL.

The output signals of counter Z3 form the address signals for a programmable read-only memory PROM2. In this read-only memory PROM2, information for all signals are stored which run along with the phase of each burst. Depending on the count of counter Z3, read-only memory PROM2 furnishes the points in time of time window signal WdW for counter Z1 and of the phase comparison control signal GS1. Because of this measure, the point in time at which the phase comparison is made, the position of control signal GS1, always lies at the same location of the burst, for example shortly before control word UW (as show in FIG. 1), regardless of whether the shift in delay of the bursts is great or small. The location for the generation of control signal GS1 is selected in this way because in this case clock pulse recovery has sufficient time to start up. With each burst, the time sequence of signals GS1 and Wdw is newly determined by way of read-only memory PROM2.

Figure 3:
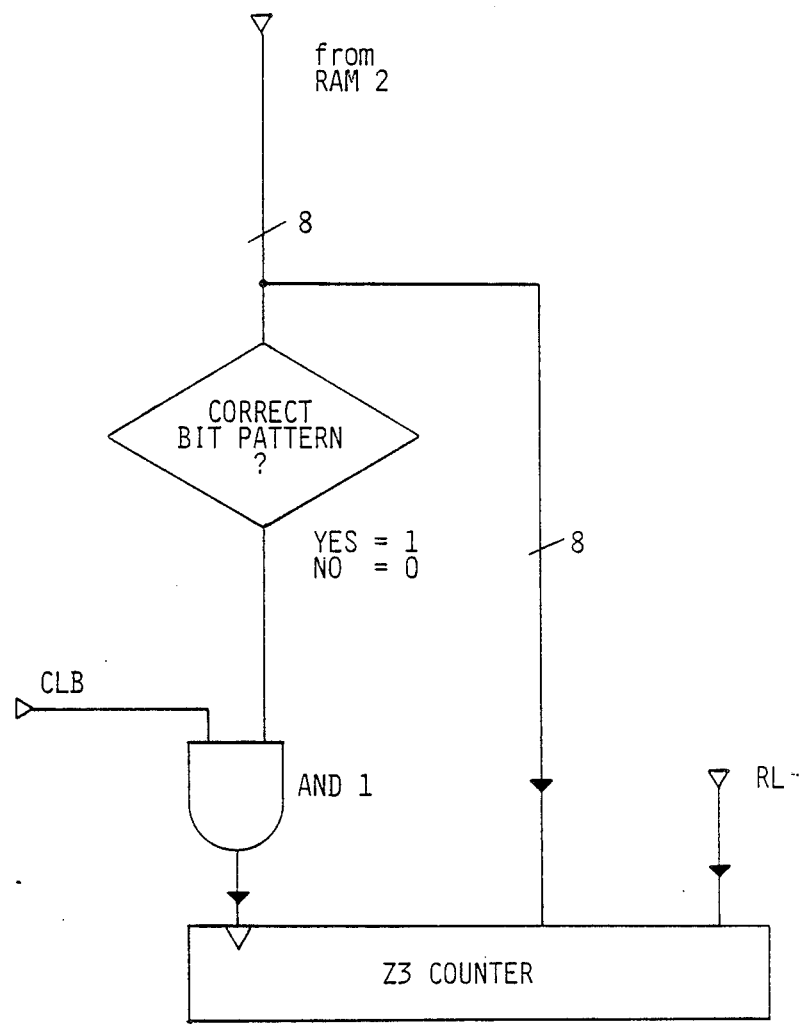
FIG. 3 shows the function of linkage Logic VL1.

The above-described arrangement is able to detect delay fluctuations in delay of ±40 bits in the respective bursts. The follow-up regulation, i.e., the time at which the phase comparison is made is made from frame to frame, is ±1 bit The function of linkage logic VL1 is shown in FIG. 3. Linkage logic VL1 first checks if a correct bit pattern at the output of memory RAM2 is present. This bit pattern check can be done in a conventional manner. If there is a connect bit pattern a logic 1 is produced, which is fed to an 8 bit AND gate AND 1 together with the system clock pulse CLB. In the case of a correct bit pattern, And gate And 1 feeds the system clock pulse CLB to the clock input of counter Z3. IF a connect bit pattern is not detected, a logic 0 is produced. In this case AND gate AND 1 blocks the system clock pulses CLB to be fed to the clock input of counter Z3. This produces the effect that counter Z3 is blocked at a time where read-only memory PROM2 outputs a window signal Wdw. This window signal Wdw is then repeatedly outputted until the end of the respective burst, resulting in a broadened window signal.

The invention now being fully described, it will be apparent to one of ordinary skill in the art that many changes and modifications can be made thereto without departing from the spirit or scope of the invention as set forth herein.

The present disclosure relates to the subject matter disclosed in Federal Republic of Germany Application No. P 37 29 586.1 of Sept. 4th, 1987, the entire specification of which is incorporated herein by reference.

What is claimed:

1. A method of compensating for shifts in the delay of bursts caused by the Doppler effect in at least one subscriber station during reception by means of a transponder, with the bursts for the respective stations each including a preamble portion followed by a unique bit pattern agreed upon between the subscriber stations and the transponder, and a following information portion, and with the bursts being combined into TDMA frames, said method comprising the steps of:
   searching the bursts of a first TDMA frame with respect to each subscriber station to locate said unique bit pattern;
   upon location of said bit pattern in a respective burst, generating a corresponding respective control signal for a phase comparison for each burst;
   utilizing the respective said control signals to perform a respective phase comparison, on each respective subscriber station burst in the next frames, between a clock pulse recovered from the preamble of the burst and the system clock pulse of the transponder; and
   delaying the bursts of each subscriber station in said next frames by
   (a) a fraction of the period of the system clock pulse if the phase of the respective recovered clock pulse lags behind the system clock pulse by up to 180°, and
   (b) a multiple of said fraction if the phase of the respective recovered clock pulse lags behind the system clock pulse by more than 180° but less than 360°.

2. A method as defined in claim 1 further comprising the steps of: storing the phase comparison results for the bursts of each subscriber station during each frame, and utilizing the stored results as reference values for the respective phase comparisons within the next following TDMA frame.

3. A method as defined in claim 2 wherein said fraction of the period of the system clock pulse is selected to be $\frac{1}{2}$ and said multiple of this fraction is selected to be 2.

4. A method as defined in claim 3 further comprising after said step of delaying, additionally delaying the bursts by $\frac{1}{4}$ of the period of the system clock pulse.

5. A method as defined in claim 1 wherein said fraction of the period of the system clock pulse is selected to be 1/2 and said multiple of this fraction is selected to be 2.

6. A method as defined in claim 1 further comprising after said step of delaying, additionally delaying the bursts by $\frac{1}{4}$ of the period of the system clock pulse.

7. A method as defined in claim 1 wherein said step of searching is performed on the delayed bursts of each said next frame.

8. A method as defined in claim 1 wherein said step of searching includes: employing a respective search window to locate the unique bit pattern of each respective burst, with the beginning of each said window being determined by the arrival of the earliest burst information from each subscriber station and with the length of said window being selected to be sufficiently large that on said unique bit pattern can be detected for the respective subscriber station and, reducing said search window to the length of the respective said unique bit pattern plus a tolerance range for the following bursts of each subscriber station.

9. A method as defined in claim 8 wherein said tolerance range is 2 bits.

10. Apparatus for use in a transponder for compensating for shifts in the delay of bursts caused by the Doppler effect in at least one subscriber station during reception by the transponder, and wherein the bursts for the respective stations are combined into TDMA frames with each burst including a preamble portion followed by a unique bit pattern agreed upon between the subscriber station and the transponder and a following information portion, said apparatus comprising:
   a first circuit means, disposed at the input of said apparatus, for serially receiving the respective bursts of a frame and for establishing a fixed phase relationship between the respective burst information and a clock pulse recovered from the respective burst preamble;
   a first linkage logic means for providing an output signal in dependence on the appearance of a generated control signal (GS1) for a phase comparison and a system clock pulse (CLB) of the transponder;
   a second circuit means for performing a phase comparison between said output signal from said first linkage logic means and said recovered clock pulse (CLR);
   a first memory means (RAM1) for storing the phase comparison results of all subscriber stations produced by said second circuit means during a frame;
   a third circuit means, connected to the output of said first circuit means and responsive to the respective said recovered clock pulse and the respective phase comparison result stored in said first memory means, for selectively delaying the respective bursts of a frame by a fraction of the period of said system clock pulse (CLB), or by a multiple of said fraction;
   a fourth circuit means for receiving the delayed bursts from said third circuit means and for establishing a fixed phase relationship between said system clock pulse (CLB) and the delayed bursts; and
   a fifth circuit means, connected to the output of said fourth circuit means for searching the bursts for each subscriber station for said unique bit pattern and for generating said control signal for a phase comparison for said first logic linkage means upon location of the respective said bit pattern.

11. Apparatus as defined in claim 10 wherein: said first circuit means comprises a first flip-flop having an input for receiving the bursts of a frame and a clock input for receiving said recovered clock pulse; said first logic linkage means comprises an OR-gate having a first input connected to receive said system clock pulse, a second input connected to receive said generated control signal, and an output; said second circuit means comprises a second flip-flop having its input connected to receive said recovered clock pulse, a clock input connected to said output of said first logic linkage means, and an output connected to said memory means; said third circuit means includes a third flip-flop having an input connected to the output of said first flip-flop, an output, and a clock input connected to the output of an exclusive OR-gate having a first input connected to the output of said memory means and a second input connected to receive said recovered clock pulse; and said fourth circuit means includes a fourth flip-flop having an input connected to the output of said third flip-flop, a clock input connected to receive said system clock pulse, and an output connected to the input of said fifth circuit means.

12. Apparatus as defined in claim 11 wherein said fourth circuit means further includes a delay circuit means, connected between said output of said third flip-flop and said input of said fourth flip-flop, for producing a delay of ¼ of the period of said system clock pulse.

13. Apparatus as defined in claim 10 wherein said fifth circuit means comprises:

a series/parallel converter means for the series/parallel conversion of the delayed bursts appearing at the output of said fourth circuit means;

a comparison stage means, connected to the parallel outputs of said series/parallel converter means, for comparing the parallel output signals of said series/parallel converter means with respective threshold values whose composition corresponds to the unique bit pattern;

a first counter means, connected to the output of said comparison stage means, for counting the number of coincidences with respect to the bit pattern;

a flip-flop having an input connected to the output of said first counter means so as to receive the counting result of said first counter means, an output, and a clock input connected to receive said system clock pulse;

a second counter means for counting said system clock pulses, and having parallel outputs, said second counter means being resettable at a fixed point in time;

a second memory means, having inputs connected to said outputs of said second counter means, for taking over the count of said second counter means, said second memory means including a read/write control input which is connected to said output of said flip-flop and which operates in dependence on the output signal of said flip-flop;

a third counter means configured as a backward counter and being resettable at the same time as said second counter means, said third counter means having parallel inputs for receiving, as a starting value for counting, the memory contents of said second memory means, and a count input connected to receive said system clock pulses;

a second linkage logic means, connected at the inputs of said third counter means, for blocking the flow of system clock pulses to said count input of said third counter means for the time until the respective bit pattern has been found; and a programmable read-only memory means, (PROM) which is addressed by the output of said third counter means, for providing said control signal for said first logic linkage means.

* * * * *